(12) United States Patent
Spafford

(10) Patent No.: X7657
(45) Date of Patent: Jul. 2, 1833

(54) FURNACE STEAM, & CONDENSED AIR APPLYING

(76) Inventor: Elizabeth C.Spafford, adminstratrix of

Elizabeth C. Spafford, administratrix of H. G. Spafford dec.

Letters Patent.

The Schedule referred to in these Letters Patent and making
part of the same, containing a description in the words of the said
Elizabeth C. Spafford herself, administratrix of Horatio Gates Spafford
of his Improvement in Mechanical Philosophy.

To all to whom these presents shall come.
Be it known that Horatio Gates Spafford of Lansingburg in the County
of Rensselaer, and State of New York, made certain important discoveries
in Mechanical Philosophy, and that by an act of Congress of the United States
approved by the President on the third day of July 1832, the Secretary of State
of the United States was directed to issue Letters Patent to said Horatio
Gates Spafford, for the said discoveries, and said Horatio Gates Spafford
having died previous to the issuing of such Letters Patent, I Elizabeth C. Spafford
of the Town, County and State aforesaid, Widow and administratrix of the said
Horatio Gates Spafford, have applied for the issuing of such Letters
Patent to me as administratrix aforesaid for the benefit of the heirs
and representatives of the said Horatio Gates Spafford, of which
discoveries in Mechanical Philosophy the following is a specification
description and schedule.

Section 1. Dr. Horatio Gates Spafford was the first discoverer of the
important fact or truth that the ascending force of lighter fluid pass-
-ing upward thro' a heavier fluid is an important principle of
Mechanical power and may be used in Mechanical Philosophy and
the arts to great advantage and is susceptible of a vast variety of
applications.

Section 2. The application of this principle of power by Dr. Horatio
Gates Spafford, within the last thirty or forty years have amounted
to about twenty, and he contemplated, to increase them, but many
untoward providences retarded his work and death closed it.

Section

Section 3. One application of the principle of power by said Stafford,
is the ascending force of condenced air through water, acting on an
overshot wheel similar to those now used in Mills and factories.
Section 4. In this application of the principle of power aforesaid
the wheel must be wholly immersed in water and should be so
constructed of wood and metal as to be balanced and of no com=
parative weight when so immersed, thus greatly diminishing
the friction of the said wheel, when in motion. This wheel may be made
fast by a horizontal or axis in open still water in a cistern bulk head or
cylinder so filled with water as to cover the wheel. The air condens-
ed by common and ordinary or other methods, being forced under
the centre of the wheel, through a pipe and discharged into the bucket
designed to ascend, near the bottom of the wheel, filling the buckets so
whose mouths are downward will cause the wheel to turn with
a force proportioned to the difference of specific gravity of the
air in the buckets and an equal bulk of water see plate 1 in
drawing.- Section 5. But it is desirable to use the power created by
condensed air more than once or on more than one wheel for it
may be used on any number of wheels with little or no diminution
of its operative power or force. The wheel must be immersed in a
cistern, bulk head or cylinder made airtight, the arbor passing through the
cistern or cylinder may be secured by a stuffing box.- above the water
in the cylinder which incloses a wheel as above, there should be
an air chamber, the condensed air is conducted into the cylinder
or cistern by a pipe and discharged under the centre near the bottom
of the wheel as above.- it ascends moving the wheel as noticed
above, and retains its condensed form or state, in the air chamber
and from this chamber by a pipe may be conveyed under a second
wheel inclosed as above and of similar construction, and retaining
its condensed form or state, still in the air chamber of the second wheel
may be passed under a third wheel, and so on until the same
power shall move fifty or one hundred wheels or more and may
be turned and made to assist in its condensation, see plate 1 in drawing The The power necessary to condense the air to move one hundred wheels or more, wheels. is not greater than that exerted by any two or three of said wheels. such has been the result of experimental demonstration by said Horatio Gates Spafford long before his death.

Section 6. In the application of this power or principle of power, the wheels may be of any size to suit the builder or operator and of different shapes & forms according to the force desired & the air may be condensed many miles distant from the place where it is designed to erect machinery or mills, or to build factories & may be conveyed to the spot in pipes with almost no loss of operative force.

Section 7. In the application of this principle of power to the use of steam an overshot wheel as above may be placed in a cylinder made air tight as above with its steam chamber above the wheel and the steam from any ordinary or common boiler used for moving steam engines of small effective force, or other boiler of any construction to suit the builder, may be conveyed under the wheel in a manner similar to that in which condensed air is used in the above description.— The water in the cylinder is soon raised or heated, to the boiling point, and the steam passing up=ward from the bottom of the cylinder and operating on the ascen=ding side of the wheel moves it with a force equal or nearly equal to that of condensed air in the above description.— The steam may be taken from the steam chamber of this first wheel and be conveyed under a second like the first and this second wheel will move with a force nearly equal to the first wheel, and the force of the first wheel will not be diminished by the pressure upon its steam chamber sufficient to drive the steam through. a pipe under the second wheel or under ten wheels in succession, and in this manner ten or more wheels placed on the same arbor or different arbors may be moved by steam from the same boiler with nearly equal force, the number and size of the wheels, may easily be pro=portioned to the size of the boiler & the pipe which conveys the steam, also the steam from the last wheel may be returned & made to to assist the operations of the boiler, by heating the water to
supply it, see plate 1 in drawing.—
Sect. 8. But the application of his principle of power to the use
of steam on which said Horatio Gates Spafford most relied and
which was most successful in demonstration was by placing
a wheel similar to those above described in the boiler, the bottom
of which should be placed a little distance from the bottom of
the boiler so as to admit a wide spread funnel, which should
collect the steam from parts near the bottom of the boiler and
convey it on the ascending side of the wheel, through a small
aperture as in the above description of the use of condensed air
and steam; The steam thus operating on the wheel by filling the buckets
designed to a second causes it to revolve with a force such as we have seen
above, at the top of the boilers and above the wheel should be a steam
chamber in which the steam is condensed by a strong pressure, and
from which chamber by a strong pipe the steam is returned a little
condensed by passing through said pipe, & is conveyed through the
boiler near the bottom, & is discharged in the funnel near its upper
extremity where the pressure is in a measure taken off by the force
of the ascending steam arising through the funnel from the bottom
of the boiler See plate II. in drawing.—
Sec. 9. In this manner, if the heat is not rendered too intense
nearly the whole steam may be saved, and made to operate success-
fully on the same wheel and the boiler for a long time need no
supply of water after being once filled.— a safety valve may be added
on the top of the steam chamber to prevent accidents.—
Sec 10. A small wheel on this principle and plan of
construction & operation immersed in mercury or quicksilver has
has exerted a prodigious force, without any perceptible waste,
though in operation for a long time. It is here to be noticed
that the heavier fluid in which the wheel as above should
be immersed, may be quicksilver or mercury, oil water and
others. Steam, condensed air, or some of the other known
gasses gasses may be used as the lighter fluid designed to ascend through the above, One method of condensing air by use of water and applying it to one or more wheels on the same axis is repre= sented by the model deposited in the Patent Office.

Witnesses
Cornelius L. Tracy
Phineas L. Whipple

Elizabeth C. Spafford Administratrix
of Horatio G. Spafford decd 17 5 0 [illegible]
[illegible]

(Drawn ~~with Rosin~~ ~~Recipt~~ ~~of Air~~ Engine) C.N.W.

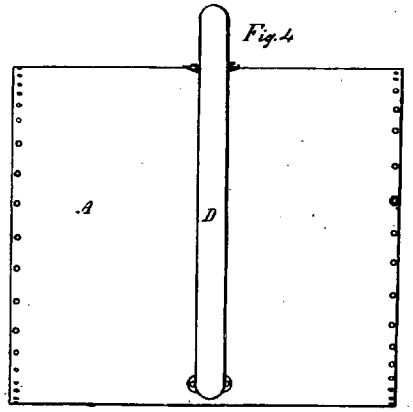
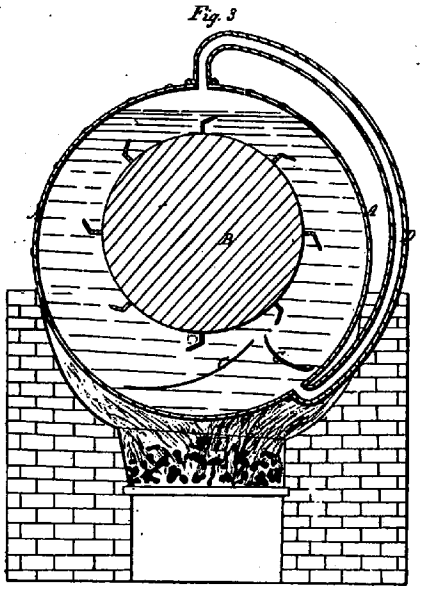

United States Patent
Patent No.: X7657
X7657
Sheet 1. 1 Sheets
C. C. Spofford.
Steam Engine.
Patented July 2. 1838.